(12) United States Patent
Inubushi et al.

(10) Patent No.: US 7,455,826 B2
(45) Date of Patent: Nov. 25, 2008

(54) LAYERED TITANIC ACID, LAMELLAR TITANIC ACID, LAMELLAR TITANIUM OXIDE AND METHOD FOR PRODUCING LAMELLAR TITANIC ACID

(75) Inventors: Akiyoshi Inubushi, Tokushima (JP); Harue Matsunaga, Tokushima (JP); Ryoichi Hiroi, Tokushima (JP)

(73) Assignee: Otsuka Chemical Co., Ltd., Osaka (JP)

( * ) Notice: Subject to any disclaimer, the term of this patent is extended or adjusted under 35 U.S.C. 154(b) by 326 days.

(21) Appl. No.: 10/487,152

(22) PCT Filed: Aug. 13, 2002

(86) PCT No.: PCT/JP02/08239

§ 371 (c)(1),
(2), (4) Date: Feb. 19, 2004

(87) PCT Pub. No.: WO03/016218

PCT Pub. Date: Feb. 27, 2003

(65) Prior Publication Data

US 2004/0234447 A1 Nov. 25, 2004

(30) Foreign Application Priority Data

Aug. 20, 2001 (JP) ............................... 2001-249392

(51) Int. Cl.
*C01G 23/00* (2006.01)
(52) U.S. Cl. ........................ 423/598; 423/609; 423/610; 428/220
(58) Field of Classification Search ................. 423/609, 423/598, 69, 82, 610; 428/220; 252/378 R
See application file for complete search history.

(56) References Cited

U.S. PATENT DOCUMENTS 4,459,352 A * 7/1984 Jones et al. .................. 430/539
5,863,514 A * 1/1999 Sasaki et al. ................ 423/609

FOREIGN PATENT DOCUMENTS

| CN | 1269768 A | 10/2000 |
| EP | 1 033 347 A1 | 9/2000 |
| EP | 1033347 | * 9/2000 |
| JP | 9-25123 A | 1/1997 |
| JP | 9-67124 A | 3/1997 |
| JP | 2656778 B2 | 5/1997 |
| JP | 10-259023 A | 9/1998 |
| JP | 11-278842 A | 10/1999 |
| JP | 11-329001 A | 11/1999 |
| JP | 3062497 B1 | 4/2000 |
| JP | 2001-81333 A | 3/2001 |
| JP | 2001-270022 A | 10/2001 |
| WO | 88/00090 | 1/1988 |
| WO | 99/11574 | 3/1999 |

OTHER PUBLICATIONS

Sasaki, Takayoshi et al , "A Mixed Alkali Titanate with the Lepidocrocite-like Layered Structure. Preparation, Crystal Structure, Protonic Form, and Acid-Base Intercalation Properties", Chem. Mater., 1998, vol. 10, pp. 4123-4128.*
Sasaki, Takayoshi et al., "Osmotic Swelling to Exfoliation. Exceptionally High Degrees of a Layered Titanate", J. Am. Chem. Soc., 1998, vol. 120, pp. 4862-4869.*
Groult, D. et al., "Nouveaux oxydes à structure en feuillets: Les titanates de potassium non-stoechiométriques $K_x(M_yTi_{2-y})O_4$", *Journal of Solid State Chemistry*, vol. 32, 1980, pp. 289-296.
Sasaki, Takayoshi et al., "A Mixed Alkali Metal Titanate with the Lepidocrocite-like Layered Structure. Preparation, Crystal Structure, Protonic Form, and Acid-Base Intercalation Properties", Chem. Mater., 1998, vol. 10, pp. 4123-4128.
Sasaki, Takayoshi et al., "Osmotic Swelling to Exfoliation. Exceptionally High Degrees of a Layered Titanate", J. Am. Chem. Soc., 1998, vol. 120, pp. 4862-4869.

* cited by examiner

Primary Examiner—Steven Bos
Assistant Examiner—Paul Wartalowicz
(74) Attorney, Agent, or Firm—Kobovcik & Kubovcik

(57) ABSTRACT

A layered titanic acid produced by subjecting a layered titanate represented by a general formula: $A_xM_y\square_zTi_{2-(y+z)}O_4$, wherein A and M represent metals having a valence of 1 to 3 and being different from each other, $\square$ represents a defect to be occupied by titanium, x is a positive and real number satisfying $0<x<1.0$, y and z are positive and real numbers satisfying $0<y+z<1.0$, to an acid treatment, to thereby substitute hydrogen ions or hydronium ions for 40 to 99% of A and/or M ions; a lamellar titanic acid produced by reacting the layered titanic acid with a basic compound, to thereby delaminate the layered titanic acid; and a lamellar titanium oxide produced by subjecting the lamellar titanic acid to a heat treatment or the like.

17 Claims, 2 Drawing Sheets

LAYERED TITANIC ACID, LAMELLAR TITANIC ACID, LAMELLAR TITANIUM OXIDE AND METHOD FOR PRODUCING LAMELLAR TITANIC ACID

TECHNICAL FIELD

The present invention relates to a layered titanic acid, lamellar titanic acid and lamellar titanium oxide which can be used for many purposes including fillers for paints and resins, cosmetic materials, pigments and catalysts and which can utilize their performances, such as heat-resisting properties, reinforcing properties, sliding properties, ultraviolet radiation shielding properties, heat radiation reflecting properties, photocatalytic properties, gas barrier properties and ion exchange capability, and also relates to a method for production of a lamellar titanic acid.

BACKGROUND ART

Production methods of a layered titanate represented by a general formula $A_xM_y\square_zTi_{2-(y+z)}O_4$ (wherein A and M are different metals each with a valence of 1-3, $\square$ represents a defect site of Ti, x is a positive real number and satisfies $0<x<1.0$, and y and z are independently 0 or a positive real number and satisfy $0<y+z<1.0$.) are described, for example, in Japanese Patent No. 2656778 and D. Groult, C. Mercy and B. Raveau, Journal of Solid State Chemistry, vol.32, p 289 (1980). According to these production methods, a layered titanate can be synthesized by calcining a mixture containing metals A and M, each in the form of its carbonate, nitrate or oxide, and titanium dioxide.

The present applicant previously discovered a production method of a layered titanate having a lamellar form, a low tendency of particle agglomeration and superior dispersibility. The method is now found in Japanese Patent No. 3062497. In accordance with this production method, a mixture is provided containing a compound which produces an oxide of a metal A when it is thermally decomposed, such as a hydroxide, carbonate or nitrate of the metal A; a compound which produces an oxide of a metal M when it is thermally decomposed, such as a hydroxide, carbonate or nitrate of the metal M; and a titanium dioxide or a titanium compound which when thermally decomposed produces titanium dioxide. Then, a flux such as a chloride or sulfate of an alkaline metal or alkaline earth metal is added to the mixture which is subsequently calcined.

The layered titanate is ion exchangeable and has the property of swelling when a basic compound is inserted between its layers, like bentonite and swelling mica. International Patent Publication No. WO 99/11574 describes a method for preparation of lamellar titania by mixing titania and an amine or ammonium compound, stirring the mixture to thereby provide a sol of lamellar titania delaminated to a single or plural layers, spray drying the lamellar titania sol to provide fine hollow particles and then grinding the fine hollow particles.

Lamellar mica and talc are used as fillers for paints and resins, cosmetic materials and pigments. The layered titanate produced by the method described in Japanese Patent No. 3062497 also has a well-dispersible lamellar form, but exhibits a smaller particle diameter/thickness ratio, compared to high-quality mica. The higher particle diameter/thickness ratio is accordingly required for the layered titanate.

A dispersing method known to be useful for delamination of the layered titanate is disclosed in International Patent Publication No. WO 99/11574.

In the method described in the above-cited International Publication, freeze drying or spray drying is required to prevent relamination or reagglomeration of the lamellar titania sol and improve dispersibility. Such freeze drying or spray drying requires special equipment, reduces productivity and increases energy consumption, which have been problems.

DISCLOSURE OF THE INVENTION

It is an object of the present invention to provide a lamellar titanate, a layered titanate as a starting material of the lamellar titanate, a lamellar titanium oxide obtained from the lamellar titanate which can solve the conventional problems, can be produced without the need of special equipment, have a large particle diameter/thickness ratio and show good dispersibility, and also provide a method for production of the lamellar titanate.

Characteristically, the layered titanate of the present invention is obtained by subjecting a layered titanate represented by a general formula $A_xM_y\square_zTi_{2-(y+z)}O_4$ (wherein A and M are different metals each with a valence of 1-3, $\square$ represents a defect site of Ti, x is a positive real number and satisfies $0<x<1.0$, and y and z are independently 0 or a positive real number and satisfy $0<y+z<1.0$.) to an acid treatment so that 40-90% of A and/or M ions is substituted by hydrogen ions or hydronium ions.

The layered titanate represented by the above general formula can be produced, for example, by the synthesis method disclosed in Japanese Patent No. 3062497. Specifically, a raw material is prepared from respective oxides of metals A, M and T or respective compounds which when heated produce such oxides. This raw material and a flux such as a halide or sulfate of an alkaline metal or an alkaline earth metal are mixed such that a flux/raw material weight ratio is brought to 0.1-2.0. The mixture is subsequently calcined at 700-1,200° C. to provide the layered titanate.

In the preceding general formula, A is a metal having a valence of 1-3 and preferably at least one selected from the group consisting of Li, Mg, Zn, Cu, Fe, Al, Ga, Mn and Ni. Specific examples include $K_{0.80}Li_{0.266}Ti_{1.733}O_4$, $Rb_{0.75}Ti_{1.75}Li_{0.25}O_4$, $Cs_{0.70}Ti_{1.77}Li_{0.23}O_4$, $Ce_{0.7}Ti_{1.825}\square_{0.175}O_4$, $Ce_{0.7}Ti_{1.65}Mg_{0.35}O_4$, $K_{0.8}Ti_{1.6}Mg_{0.4}O_4$, $K_{0.8}Ti_{1.6}Ni_{0.4}O_4$, $K_{0.8}Zn_{1.6}Mg_{0.4}O_4$, $K_{0.8}Ti_{1.6}Cu_{0.4}O_4$, $K_{0.8}Ti_{1.2}Fe_{0.8}O_4$, $K_{0.8}Ti_{1.2}Mn_{0.8}O_4$, $K_{0.76}Ti_{1.73}Li_{0.22}Mg_{0.05}O_4$ and $K_{0.67}Ti_{1.73}Al_{00.7}Li_{0.2}O_4$.

A plate-shaped crystal of the layered titanate can be converted to a layered titanic acid containing hydronium ions substituted for the A and/or M ions by an acid treatment. The layered titanic acid, as used herein, is intended to encompass a hydrated titanic acid incorporating water molecules between its layers. The acid for use in the acid treatment is not particularly specified in type and may be mineral acid such as hydrochloric acid, sulfuric acid, nitric acid, phosphoric acid or boric acid, or organic acid. The type of the layered titanate, type and concentration of the acid and slurry concentration of the layered titanate all affect the percentage of exchange of the A and/or M ion. In general, a higher acid concentration and a higher slurry concentration increase the amount of cations left between adjacent layers, thereby reducing the occurrence of delamination. Accordingly, the lamellar titanic acid subsequent to delamination retains a larger proportion of an original thickness of the layered titanate. The percentage of exchange is generally preferably 40-99%, more preferably 75-99%. The lower percentage of exchange sometimes retard delamination which is later effected by a basic compound. When it is difficult to remove cations between layers, the acid treatment may be repeated, if needed.

For the layered titanate as synthesized by the flux calcination process disclosed in the above Patent Publication, the percentage of exchange of the A and/or M ion is generally unlikely to exceed 99%. Accordingly, the use of such a layered titanate as a raw material adequately suppresses the tendency of interlayer swelling and thus prevents separation thereof into single-layer portions. As a result, the lamellar titanic acid can be provided which has the thickness of about several tens—several hundreds of layers.

In International Patent Publication No. WO 99/11574, it is described that the percentage of exchange of the A and/or M ion reaches nearly 100% for the layered titanate synthesized by a solid phase process. However, the use of such a layered titanate as a raw material results in the increased occurrence of delamination to single-layer portions. Hence, the exchange of the A and/or M ion is preferably maintained at the percentage of 40-99%, more preferably 75-99%, as described above.

The layered titanic acid, when obtained as a result of the acid treatment whereby the percentage of ion exchange is made to exceed 99%, is likely to delaminate to single-layer portions, as stated above. When such a layered titanic acid is used, it is accordingly preferred that the loading of the basic compound is decreased. This somewhat reduces the occurrence of the layered titanic acid to delaminate to single-layer portions. However, agglomeration may occur during a drying process. Reduction of an aspect ratio may also occur.

Characteristically, the lamellar titanic acid of the present invention is obtained by allowing the basic compound having an interlayer swelling effect to act on the layered titanic acid of the present invention to thereby delaminate the layered titanic acid.

Examples of basic compounds having the interlayer swelling effect include alkylamines such as methylamine, ethylamine, n-propylamine, diethylamine, triethylamine, butylamine, pentylamine, hexylamine, octylamine, dodecylamine, stearylamine, dipentylamine, dioctylamine and 2-ethyl-hexylamine, and their salts; alkanolamines such as ethanolamine, diethanolamine, triethanolamine, isopropanolamine, diiso-propanolamine, triisopropanolamine and 2-amino-2-methyl-1-propanol, and their salts; quaternary ammonium hydroxides such as tetramethylammonium hydroxide, tetraethylammonium hydroxide, tetrapropylammonium hydroxide and tetrabutyl-ammonium hydroxide, and their salts; quaternary ammonium salts such as cetyltrimethylammonium salts, stearyltrimethyl ammonium salts, benzyltrimethylammonium salts, dimethyl-distearylammonium salts, dimethylstearylbenzylammonium salts and stearylbis(2-hydroxyethyl)methylammonium salts; 3-methoxypropylamine; 3-ethoxypropylamine; and the like. These basic compounds may be used alone or in combination.

The basic compound is allowed to act on the layered titanic acid by adding the basic compound, either directly or in the form of a dilute solution in water or an aqueous medium, to a suspension in water or an aqueous medium of the layered titanic acid, and then stirring the mixture. The loading of the basic compound is preferably 5-200 equivalent %, more preferably 5-40 equivalent %, of the ion exchange capacity of the layered titanic acid. The ion exchange capacity, as used herein, refers to a value given by mx+ny, wherein m and n are respective valences of A and M in the layered titanate represented by the general formula $A_xM_y\square_zTi_{2-(y+z)}O_4$ (wherein A and M are different metals each with a valence of 1-3, $\square$ represents a defect site of Ti, x is a positive real number and satisfies 0<x<1.0, and y and z are independently 0 or a positive real number and satisfy 0<y+z<1.0.). As such, the use of the basic compound in the amount smaller than the equivalent amount enables delamination of the layered titanic acid to a lamellar titanic acid with a mean thickness of 0.01-2 μm. If less than 5 equivalent %, delamination of the layered titanic acid may not be effected. If greater than 40 equivalent %, excessive delamination may proceed to thereby increase a proportion of the lamellar titanic acid that has a thickness of below 0.01 μm. Then, the subsequent drying increases the occurrence of relamination or reagglomeration. This in some cases prevents use of a filter drying process for use in the conventional powder production and requires the practice of spray drying or freeze drying. The loading of greater than 200 equivalent % does not provide a further delaminating effect and thus becomes economically disadvantageous.

The basic compound is added to the layered titanic acid to provide a mixture which is subsequently stirred to effect delamination of the layered titanic acid. In this process, stirring with a high shear force is preferably avoided. This is because such strong stirring causes size reduction of particles of the lamellar titanic acid and increases fine particles with low aspect ratios. Preferably, weak stirring is utilized such that delamination of the layered titanic acid is achieved by a moderate interlayer swelling effect of the basic compound. This results in obtaining the lamellar titanic acid which is comparable in particle size distribution to the layered titanate as a starting material.

After delamination by the action of the basic compound, the resultant may be subjected to an acid treatment, if needed, so that the basic compound used for delamination is removed either partially or entirely. Simultaneously, a part of the A and/or M ions in the remaining titanic acid compound may be removed by this acid treatment. For example, 50-99% of the A and/or M ions in the layered titanate compound may be substituted by hydrogen or hydronium ions as a result of this acid treatment. Alternatively, higher than 99% of the A and/or M ions may be substituted by hydrogen or hydronium ions. It is expected that the acid treatment, if accompanied by heating, can accelerate the reaction and also becomes effective to suppress agglomeration of the layered titanic acid when dried.

In order to further improve dispersibility of the lamellar titanic acid, generally-known surface treating or surface coating may be performed. A dispersion stabilizer may also be added to the suspension of lamellar titanic acid, when needed.

Characteristically, the lamellar titanium oxide of this invention is obtained by subjecting the above-described lamellar titanic acid to a heat or hydrothermal treatment. The heat treatment is preferably performed at a temperature of 200-1,200° C., more preferably 300-1,000° C. The hydrothermal treatment is preferably performed at a temperature of 120° C. or above, more preferably 150° C. or above. By this heat or hydrothermal treatment, the lamellar titanic acid can be converted mostly to a titanium oxide, while retaining its lamellar shape, and partly to compounds derived from the remaining A and M ions.

Also, dispersion of the lamellar titanic acid of this invention in a liquid medium results in the provision of a suspension of lamellar titanic acid. This suspension of lamellar titanic acid, if applied to a substrate such as a glass, ceramic, metal or resin film and then dried, provides a film of titanic acid. This film, because of its high refractive index and dielectric constant, can be utilized as an anti-reflection film or a high-dielectric index thin film. The photocatalytic, ultraviolet shielding and heat-reflecting effects can also be expected. Water, aqueous media and organic solvent media are useful liquid media for dispersion of the lamellar titanic acid. When necessary to aid formation of the film, a polymer, dispersant, surfactant, organic or inorganic sol may be used within the range that does not impede the purposes of this invention.

The film formed via application of the suspension of lamellar titanic acid may be subsequently heat treated at 300° C. or above. This converts titanic acid to titanium oxide and provides a film of titanium oxide. This film of titanium oxide can be utilized as a further superior photocatalytic film, high-refractive index film, high-dielectric constant film, ultraviolet shielding film or heat-reflecting film.

One method for production of the lamellar titanic acid, in accordance with this invention, uses the layered titanate synthesized via the flux calcination process as a raw material. Characteristically, a layered titanic acid is first obtained by substituting 40-99%, preferably 75-99%, of A and/or M ions in the layered titanate with hydrogen or hydronium ions. The basic compound having the interlayer swelling effect in the amount of 5-200 equivalent %, preferably 5-40 equivalent %, is then allowed to act on the layered titanic acid to thereby delaminate the layered titanic acid to a mean thickness of 0.01-2 μm.

Another method for production of the lamellar titanic acid, in accordance with this invention, utilizes the layered titanate synthesized via the solid phase process as a raw material. Characteristically, a layered titanate represented by the general formula $A_xM_y\square_zTi_{2-(y+z)}O_4$ (wherein A and M are different metals each with a valence of 1-3, $\square$ represents a defect site of Ti, x is a positive real number and satisfies $0<x<1.0$, and y and z are independently 0 or a positive real number and satisfy $0<y+z<1.0$.) is subjected to an acid treatment so that it is converted to a layered titanic acid via substitution of hydrogen or hydronium ions for over 99% of the A and/or M ions. Subsequently, a basic compound having an interlayer swelling effect in the amount of 5-40 equivalent % is allowed to act on the layered titanic acid to thereby delaminate the layered titanic acid to a mean thickness of 0.01-2 μm.

This method produces very thin lamellar titanic acid, as described above. Drying tends to cause agglomeration of its powder particles, so that it is likely rendered into a form of a plate which is larger than the initial particle size.

BEST MODE FOR CARRYING OUT THE INVENTION

Figure 1:
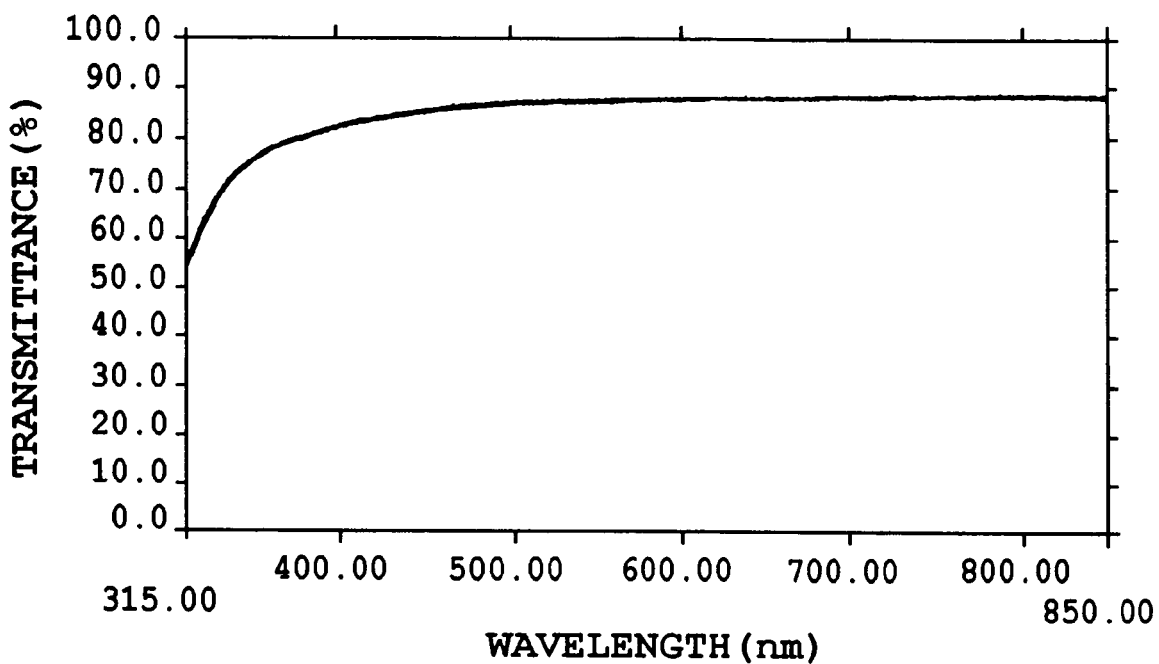
FIG. 1 is an absorption spectrum of a thin film of layered titanic acid as formed on PET in Example 7.

The present invention is below described by way of specific examples. However, the present invention is not limited thereto. The elements present in the compounds were quantitatively analyzed. Specifically, the amount of K, Ti or Mg was determined by an X-ray fluorescence analysis and recorded as the respective amount of $K_2O$, $TiO_2$ or $MgO$. The amount of Li was determined by a flame spectrochemical analysis after the compound was dissolved in sulfuric acid containing ammonium sulfate, and recorded as the amount of $Li_2O$.

EXAMPLE 1

27.64 g of potassium carbonate, 4.91 g of lithium carbonate, 69.23 g of titanium dioxide and 74.56 g of potassium chloride were dry ground and mixed to provide a raw material which was subsequently calcined at 1,100° C. for 4 hours. After calcination, the resulting sample was immersed in 10 kg pure water, stirred for 20 hours, separated, washed with water and dried at 110° C. This resulted in obtaining a white powder which was identified as a layered titanate $K_{0.80}Li_{0.266}Ti_{1.733}O_4$ with a mean particle diameter of 44 μm and a mean thickness of 3 μm.

65 g of this $K_{0.80}Li_{0.266}Ti_{1.733}O_4$ was dispersed with stirring in 5 kg of 3.5% hydrochloric acid to exchange K ions and Li ions with hydrogen ions or hydronium ions. The subsequent separation and washing with water resulted in obtaining a layered titanic acid. The amount of $K_2O$ remained in the layered titanic acid was found to be 2.0%. The percentage of exchange of K ions was 92% and the percentage of exchange of Li ions was 99% or over. The percentage of exchange of K ions and Li ions, in combination, was 94%. This layered titanic acid was dispersed in 5 kg water. Subsequently, 250 g (11 equivalent %) of a 1% aqueous solution of n-propylamine was added thereto with stirring. After about 30 minutes of stirring, 3.5% hydrochloric acid was added to adjust the dispersion to a pH of 2.0. After an hour of stirring, the dispersion was separated by suction filtration. The resulting wet cake was dispersed in water, washed with water and separated again. This process was repeated three times to achieve sufficient washing. The resultant was dried at 110° C. for 15 hours and then disintegrated by a mixer to obtain a powder of lamellar titanic acid. This powder was found to have a residual $K_2O$ content of 1.1%, a mean particle diameter of 30 μm and a mean thickness of 0.3 μm.

EXAMPLE 2

The layered titanate, $K_{0.80}Li_{0.266}Ti_{1.733}O_4$, was synthesized in the same conditions as used in Example 1. 65 g of this $K_{0.80}Li_{0.266}Ti_{1.733}O_4$ was dispersed with stirring in 5 kg of 0.17% hydrochloric acid to exchange K ions and Li ions with hydrogen ions or hydronium ions. The subsequent separation and washing with water resulted in obtaining a layered titanic acid. The amount of $K_2O$ remained in the layered titanic acid was found to be 4.5%. The percentage of exchange of K ions was 82% and the percentage of exchange of Li ions was 99% or over. The percentage of exchange of K ions and Li ions, in combination, was 86%. This layered titanic acid was dispersed in 5 kg water. Subsequently, 250 g (11 equivalent %) of 1% aqueous solution of n-propylamine was added thereto with stirring. After about 30 minutes of stirring, 3.5% hydrochloric acid was added to adjust the dispersion to a pH of 2.0. After an hour of stirring, the dispersion was separated by suction filtration. The resulting wet cake was dispersed in water, washed with water and separated again. This process was repeated three times to achieve sufficient washing. The resultant was dried at 110° C. for 15 hours and then disintegrated by a mixer to obtain a powder of lamellar titanic acid. This powder was found to have a residual $K_2O$ content of 2.3%, a particle diameter of 32 μm and a mean thickness of 0.6 μm.

EXAMPLE 3

A lamellar titanic acid was obtained using the same conditions as in Example 1, except that the basic compound for use in the delamination comprised 350 g (12 equivalent %) of 1% isopropanolamine. Measurement revealed a residual $K_2O$ content of 1.0%, a mean particle diameter of 30 μm and a mean thickness of 0.2 μm.

EXAMPLE 4

The layered titanate, $K_{0.80}Li_{0.266}Ti_{1.733}O_4$, was synthesized in the same conditions as in Example 1, except that the calcination temperature was 950° C. Its mean particle diameter and mean thickness were 9 μm and 1 μm, respectively. This layered titanate was subjected to the same separation treatment as in Example 1 to obtain an undried lamellar titanic acid which was subsequently dispersed in water to provide a 5% slurry. The slurry was subjected to a hydrothermal treatment in a pressure container at 150° C. for 48 hours, separated and dried at 110° C. The resulting powder was identified as an anatase lamellar titanic acid and found to have a mean particle diameter of 8.6 μm and a mean thickness of 0.3 μm.

EXAMPLE 5

28.3 g of potassium carbonate, 11.7 g of magnesium hydroxide, 64 g of titanium dioxide and 75 g of potassium chloride were dry ground and mixed to provide a raw material which was subsequently calcined at 1,100° C. for 3 hours to prepare a layered titanate $K_{0.80}Mg_{0.40}Ti_{1.60}O_4$. After calcination, the resulting sample was immersed in 10 kg pure water, stirred for 20 hours, separated, washed with water and dried at 110° C. This resulted in obtaining a white powder with a mean particle diameter of 5 μm and a mean thickness of 1 μm.

65 g of this $K_{0.80}Mg_{0.40}Ti_{1.60}O_4$ was dispersed with stirring in 5 kg of 3.5% hydrochloric acid to exchange K ions and Li ions with hydrogen ions or hydronium ions. This exchange process was repeated three times. The subsequent separation and washing with water resulted in obtaining a layered titanic acid. A residual $K_2O$ content and a residual MgO content of the layered titanic acid were 0.5% and 1.0%, respectively. The percentage of exchange of K ions was 98% and the percentage of exchange of Mg ions was 92%. The percentage of exchange of K ions and Mg ions, in combination, was 96%. This layered titanic acid was dispersed in 5 kg water. Subsequently, 500 g (23 equivalent %) of a 1% aqueous solution of n-propylamine was added thereto with stirring. After about 30 minutes of stirring, 3.5% hydrochloric acid was added to adjust the dispersion to a pH of 2.0. After an hour of stirring, the dispersion was separated. The resulting wet cake was dispersed in water, washed with water and separated again. This process was repeated three times to achieve sufficient washing. The resultant was dried at 110° C. for 15 hours and then disintegrated by a mixer to obtain a powder of lamellar titanic acid. This powder was found to have a mean particle diameter of 5 μm and a mean thickness of 0.3 μm.

EXAMPLE 6

The layered titanate $K_{0.80}Li_{0.266}Ti_{1.733}O_4$ having a mean particle diameter of 9 μm was provided as a raw material. This raw material and the same conditions as in Example 1 were used to obtain a dry powder of lamellar titanic acid which was subsequently calcined. An X-ray diffraction pattern of a product obtained via calcination at 500° C. for 2 hours indicated anatase titanium oxide. An X-ray diffraction pattern of a product obtained via calcination at 800° C. for 2 hours indicated a peak for rutile titanium oxide and a peak for a slight amount of potassium hexatitanate. The powder was found to well retain the lamellar shape.

EXAMPLE 7

Figure 2:
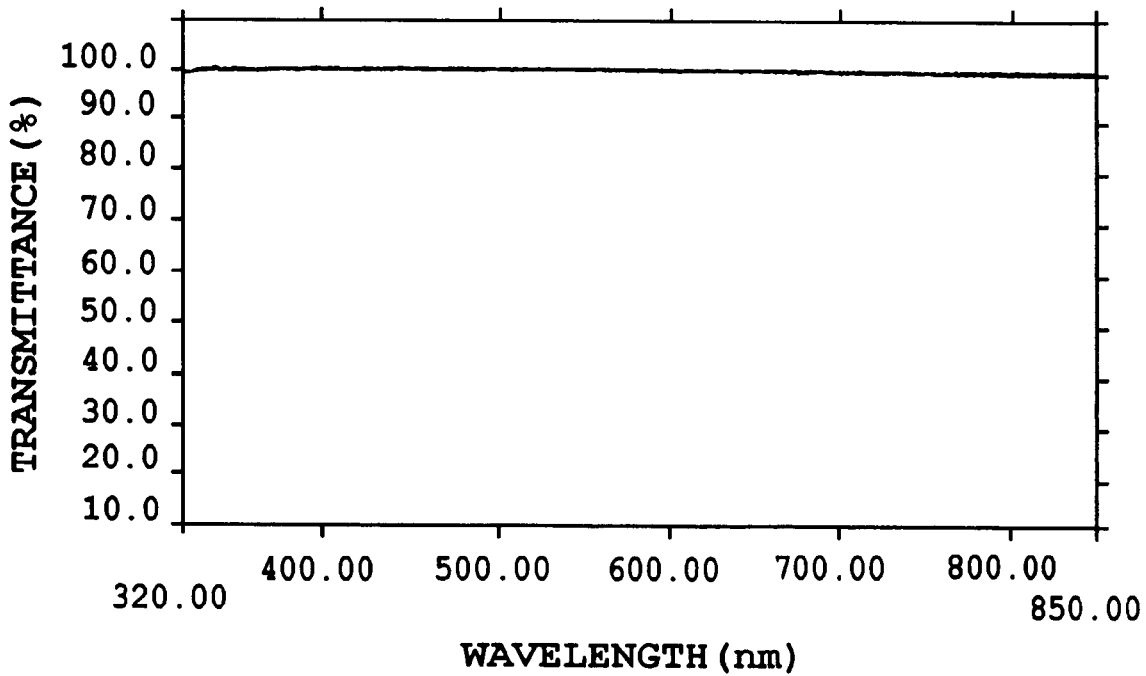
FIG. 2 is an absorption spectrum of PET.

The same conditions as in Example 1 were utilized to synthesize a layered titanic acid from the layered titanate $K_{0.80}Li_{0.266}Ti_{1.733}O_4$. The layered titanic acid was dispersed, while separated, in 750 g (33 equivalent %) of a 1% aqueous solution of propylamine. The resulting suspension of lamellar titanic acid was coated onto a PET sheet and dried at room temperature to form a thin film of layered titanic acid which was further dried at 110° C. Ellipsometer measurement of the thin film revealed a refractive index of 2.3. Cavity resonator measurement revealed a dielectric constant at 3 GHz of 3.17 for the PET sheet without the thin film and 3.44 for the PET sheet with the thin film of layered titanic acid (wherein a thickness of the thin film of layered titanic acid was 9.5 μm on the basis of 100 μm thickness of the PET sheet). The 0.8 μm thick thin film of layered titanic acid that was formed on the PET sheet was measured using an ultraviolet-visible absorptiometer. The resulting absorption spectrum is shown in FIG. 1. Also, the absorption spectrum of the PET sheet alone is shown in FIG. 2 for reference.

EXAMPLE 8

A suspension of lamellar titanic acid was synthesized using the same conditions as in Example 7, coated onto a glass substrate and naturally dried to form a thin film of lamellar titanic acid which was further dried at 120° C. Also, the thin film was heat treated at 300° C. for 1 hour to convert titanic acid to titanium oxide. A 10 ppm aqueous solution of methylene blue was dripped onto the thin film prior to and subsequent to the heat treatment at 300° C. and onto the glass alone, 0.1 ml for each. Each of them was exposed for 2 hours to a black light (1 mW·cm$^{-2}$). A blue color of methylene blue was slightly removed from the thin film dried at 120° C. and completely removed from the thin film after the heat treatment at 300° C., while the blue color was held in the glass alone.

EXAMPLE 9

27.64 g of potassium carbonate, 4.91 g of lithium carbonate and 69.23 g of titanium dioxide were dry ground and mixed to provide a raw material which was subsequently calcined at 850° C. for 4 hours. The resulting layered titanate was identified as $K_{0.80}Li_{0.266}Ti_{1.733}O_4$ and, after grinding, exhibited a mean particle diameter of 5 μm and a mean thickness of 2 μm. 65 g of this $K_{0.80}Li_{0.266}Ti_{1.733}O_4$ was dispersed with stirring in 5 kg of 3.5% hydrochloric acid and then filtered. The resultant was washed with 5 kg of 2% hydrochloric acid on a Buchner funnel to obtain a layered titanic acid which incorporated hydrogen ions or hydronium ions in exchange for K ions and Li ions. The layered titanic acid was then washed with water and its residual $K_2O$ content was found to be 0.14%. The percentage of exchange of K ions and Li ions, in combination, was 99.6%. This layered titanic acid was dispersed in 5 kg water. Subsequently, 250 g (11 equivalent %) of a 1% aqueous solution of n-propylamine was added thereto with stirring. After about 30 minutes of stirring, 3.5% hydrochloric acid was added to adjust the dispersion to a pH of 2.0. After an hour of stirring, the dispersion was separated by suction filtration. The resulting wet cake was dispersed in water, washed with water and separated again. This process was repeated three times to achieve sufficient washing. The resultant was dried at 110° C. for 15 hours and then disintegrated by a mixer to obtain a powder of lamellar titanic acid. This powder was found to consist of a stack of very thin titanic acid layers having a thickness of 0.1 μm or below and have a form of a plate having a dimension larger than the original particle size. Its mean particle diameter and mean thickness were 10 μm and 0.5 μm, respectively.

EXAMPLE 10

The layered titanate $K_{0.80}Li_{0.266}Ti_{1.733}O_4$ was synthesized in the same conditions as in Example 1, except that the calcination temperature was 950° C. Its mean particle diameter and mean thickness were 9 µm and 1 µm, respectively. 13 g of this $K_{0.80}Li_{0.266}Ti_{1.733}O_4$ was dispersed with stirring in 200 g of 1.75% hydrochloric acid to obtain a layered titanic acid which incorporated hydrogen ions or hydronium ions in exchange for K ions and Li ions. The layered titanic acid was then washed with water and its residual $K_2O$ content was found to be 6.0%. The percentage of exchange of K ions was 76% and the percentage of exchange of Li ions was 99% or over. The percentage of exchange of K ions and Li ions, in combination, was 82%. This layered titanic acid was dispersed in 600 g water. Subsequently, 250 g (22 equivalent %) of a 0.6% aqueous solution of 3-methoxypropylamine was added with stirring. After about an hour of stirring, 100 g of 3.5% hydrochloric acid was added. Thereafter, the dispersion was stirred at 60° C. and then separated by suction filtration. The resulting wet cake was dispersed in water, washed with water and separated again. This process was repeated three times to achieve sufficient washing. The resultant was dried at 110° C. for 15 hours or longer and then disintegrated by a mixer to obtain a powder of lamellar titanic acid. This powder was found to have a residual $K_2O$ content of 2.1%, a mean particle diameter of 6.2 µm and a mean thickness of 0.04 µm.

EXAMPLE 11

27.64 g of potassium carbonate, 4.91 g of lithium carbonate, 69.23 g of titanium dioxide and 74.56 g of potassium chloride were dry ground and mixed to provide a raw material which was subsequently calcined at 1,100° C. for 4 hours. After calcination, the resulting sample was immersed in 10 kg pure water, stirred for 20 hours, separated, washed with water and dried at 110° C. This resulted in obtaining a white powder which was identified as a layered titanate $K_{0.80}Li_{0.266}Ti_{1.733}O_4$ with a mean particle diameter of 44 µm and a mean thickness of 3 µm.

10 g of this $K_{0.80}Li_{0.266}Ti_{1.733}O_4$ was dispersed with stirring in 1 kg of 0.5 N acetic acid to obtain a layered titanic acid which incorporated hydrogen ions or hydronium ions in exchange for K ions and Li ions. The layered titanic acid, subsequent to separation and washing with water, exhibited a residual $K_2O$ content of 8.0% and a residual $Li_2O$ content of 1.1%. A percentage of exchange of K ions was 67% and a percentage of exchange of Li ions was 58%. The percentage of exchange of K ions and Li ions,. in combination, was 65%. This layered titanic acid was dispersed in 1 kg water. Subsequently, 63 g (18 equivalent %) of a 1% aqueous solution of n-propylamine was added with stirring. After about 30 minutes of stirring, 100 g of 3.5% hydrochloric acid was added to the dispersion which was subsequently stirred at 60° C. and then separated by suction filtration. The resulting wet cake was dispersed in water, washed with water and separated again. This process was repeated twice to achieve sufficient washing. The resultant was dried at 110° C. for 15 hours and then disintegrated by a mixer to obtain a powder of a lamellar titanic acid compound. This powder was found to have a residual $K_2O$ content of 2.5%. Measurement of this powder revealed a percentage of exchange of K ions of 90%, a percentage of exchange of Li ions of 99% or over, a mean particle diameter of 29 µm and a mean thickness of 0.25 µm.

EXAMPLE 12

Figure 3:
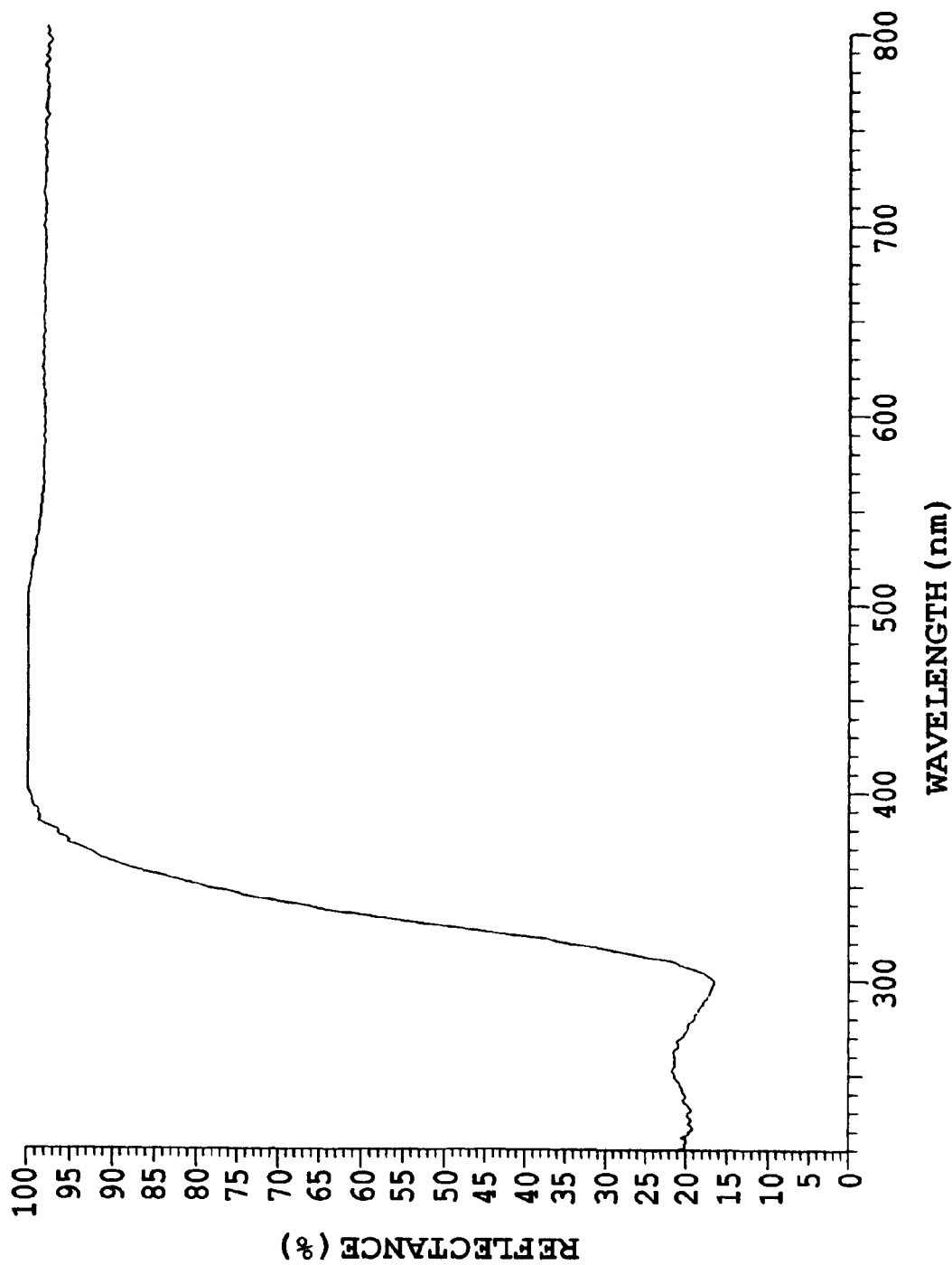
FIG. 3 is an ultraviolet-visible absorption spectrum of the lamellar titanic acid compound prepared in Example 12, when measured by a reflection method.

The layered titanate $K_{0.80}Li_{0.266}Ti_{1.733}O_4$ was synthesized using the same conditions as in Example 11. 10 g of this $K_{0.80}Li_{0.266}Ti_{1.733}O_4$ was dispersed with stirring in 1 kg of 2% boric acid to exchange K ions and Li ions with hydrogen ions or hydronium ions. The subsequent separation and washing with water resulted in obtaining a layered titanic acid. The layered titanic acid exhibited a residual $K_2O$ content of 11%, a residual $Li_2O$ content of 2.1%, a percentage of exchange of K ions of 53% and a percentage of exchange of Li ions of 16%. The percentage of exchange of K ions and Li ions, in combination, was 44%. This layered titanic acid was dispersed in 1 kg water. Subsequently, 33 g (100 equivalent %) of a 10% aqueous solution of n-propylamine was added with stirring. After about an hour of stirring, 100 g of 3.5% hydrochloric acid was added to the dispersion which was subsequently stirred and then separated. The resulting wet cake was dispersed in water, washed with water and separated again. This process was repeated twice to achieve sufficient washing. The resultant was dried at 110° C. for 15 hours and then disintegrated by a mixer to obtain a powder of a lamellar titanic acid compound. Measurement of this powder revealed a residual $K_2O$ content of 7.3%, a percentage of exchange of K ions of 71%, a percentage of exchange of Li ions of 99% or over, a mean particle diameter of 32 µm and a mean thickness of 0.4 µm. An ultraviolet-visible absorption spectrum of this powder, as measured by a reflection method, is shown in FIG. 3. An ultraviolet absorption appears in a wavelength region that is shorter than 400 nm.

EXAMPLE 13

The layered titanate $K_{0.80}Li_{0.266}Ti_{1.733}O_4$ was synthesized in the same conditions as in Example 1, except that the calcination temperature was set at 950° C. 10 g of this $K_{0.80}Li_{0.266}Ti_{1.733}O_4$ (mean particle diameter of 9 µm and mean thickness of 1 µm) was dispersed with stirring in 1 kg of 0.5 N acetic acid to obtain a layered titanic acid compound which incorporated hydrogen ions or hydronium ions in exchange for K ions and Li ions. The layered titanic acid, subsequent to separation and washing with water, exhibited a residual $K_2O$ content of 7.9% and a residual $Li_2O$ content of 1.1%. A percentage of exchange of K ions was 68% and a percentage of exchange of Li ions was 58%. The percentage of exchange of K ions and Li ions, in combination, was 66%. This layered titanic acid compound was dispersed in 1 kg water. Subsequently, 80 g (23 equivalent %) of a 1% aqueous solution of n-propylamine was added with stirring. After about an hour of stirring, 100 g of 3.5% hydrochloric acid was added to the dispersion which was subsequently stirred at 60° C. and then suction filtered. The separated cake was again added to 1 kg of 0.5 N hydrochloric acid which was subsequently stirred and suction filtered. This process was repeated three times. Thereafter, the separated wet cake was dispersed in water, washed with water and separated again. This process was repeated twice to achieve sufficient washing. The resultant was dried at 110° C. for 15 hours and then disintegrated by a mixer to obtain a powder of a lamellar titanic acid compound. Measurement of this powder revealed a residual $K_2O$ content of 0.2%, a percentage of exchange of K ions of 99.3%, a percentage of exchange of Li ions of nearly 100%, a mean particle diameter of 7.8 µm and a mean thickness of 0.1 µm.

EXAMPLE 14

The $K_{0.80}Li_{0.266}Ti_{1.733}O_4$ (mean particle diameter of 9 μm and mean thickness of 1 μm) used in Example 13 was provided as a raw material. This raw material and the same conditions as in Example 11 were used to obtain a lamellar titanic acid compound. Measurement of this powder revealed a residual $K_2O$ content of 2.0%, a percentage of exchange of K ions of 92%, a percentage of exchange of Li ions of 99% or over, a mean particle diameter of 8.2 μm and a mean thickness of 0.15 μm. This undried product was again dispersed in water to a 5% slurry which was then subjected to a hydrothermal treatment in a pressure container at 150° C. for 48 hours, separated and dried at 110° C. The resulting powder was observed as having a lamellar shape and identified as anatase titanic acid by X-ray diffraction. Its mean particle diameter and mean thickness were 8.6 μm and 0.3 μm, respectively.

EXAMPLE 15

The $K_{0.80}Li_{0.266}Ti_{1.733}O_4$ (mean particle diameter of 9 μm and mean thickness of 1 μm) used in Example 13 was provided as a raw material. The hydrochloric acid treatment following the n-propylamine treatment was carried out at room temperature. Otherwise, the same conditions as in Example 11 were used to obtain a lamellar titanic acid compound. Measurement of this powder revealed a residual $K_2O$ content of 5.1%, a percentage of exchange of K ions of 80%, a percentage of exchange of Li ions of 99% or over, a mean particle diameter of 8.3 μm and a mean thickness of 0.15 μm. This dried powder was calcined at 500° C. for 2 hours. X-ray diffraction of the resultant showed the presence of anatase titanium oxide. Also, the dried powder was calcined at 800° C. for 2 hours. X-ray diffraction of the resultant showed the presence of rutile titanium oxide, anatase titanium oxide and a small amount of potassium hexatitanate. Either powder was found to well retain a lamellar shape.

EXAMPLE 16

10 g of the layered titanate $K_{0.80}Mg_{0.40}Ti_{1.60}O_4$, as obtained in the same manner as in Example 5, was dispersed with stirring in 5 kg of 3.5% hydrochloric acid to exchange K ions and Li ions with hydrogen ions or hydronium ions. This operation was followed by separation and washing with water to obtain a layered titanic acid. This layered titanic acid exhibited a residual $K_2O$ content of 1.7% and a residual MgO content of 5.8%. A percentage of exchange of K ions was 94% and a percentage of exchange of Mg ions was 50%. The percentage of exchange of K ions and Mg ions, in combination, was 66%. This layered titanic acid was dispersed in 5 kg water. Subsequently, 600 g (70 equivalent %) of a 5% aqueous solution of isopropanolamine was added with stirring. After about 30 minutes of stirring, 3.5% hydrochloric acid was added to adjust the dispersion to a pH of 2.0. After an hour of stirring, the dispersion was separated. This hydrochloric acid treatment was carried out again. Thereafter, the resulting wet cake was dispersed in water, washed with water and separated again. This process was carried out twice to achieve sufficient washing. The resultant was dried at 110° C. for 15 hours and then disintegrated by a mixer to obtain a powder of a lamellar titanic acid compound. Measurement of this powder revealed a percentage of exchange of K ions of 98%, a percentage of exchange of Mg ions of 85%, a mean particle diameter of 5 μm and a mean thickness of 0.2 μm.

EXAMPLE 17

10 g of the layered titanate $K_{0.80}Li_{0.266}Ti_{1.733}O_4$ (mean particle diameter of 9 μm and mean thickness of 1 μm) synthesized in Example 13 was dispersed with stirring in 1 kg of 0.5 N acetic acid to obtain a layered titanic acid compound incorporating hydrogen ions or hydronium ions in exchange for K ions and Li ions under the same conditions as in Example 14. This layered titanic acid compound was dispersed in 1 kg water. Subsequently, 33 g (100 equivalent %) of a 10% aqueous solution of n-propylamine was added with stirring to achieve delamination and dispersion of the layered titanic acid compound. The resulting suspension of lamellar titanic acid compound was coated onto a PET sheet and dried at room temperature to form a thin film of layered titanic acid compound. Thereafter, the thin film was further dried at 110° C. Ellipsometer measurement of the thin film revealed a refractive index of 2.3. Cavity resonator measurement revealed a dielectric constant at 3 GHz of 3.17 for the PET sheet alone without the thin film and 3.53 for the PET sheet with the thin film of layered titanic acid compound (wherein a thickness of the thin film of layered titanic acid compound was 13 μm on the basis of 100 μm thickness of the PET sheet).

EXAMPLE 18

A suspension of lamellar titanic acid compound was synthesized using the same conditions as in Example 17, coated onto a glass substrate and naturally dried to form a thin film of lamellar titanic acid compound. Thereafter, the thin film was further dried at 120° C. Also, the thin film was heat treated at 300° C. for 1 hour to convert the titanic acid compound to a titanium oxide compound. A 10 ppm aqueous solution of methylene blue was dripped onto the thin film prior to and subsequent to the heat treatment at 300° C. and onto the glass alone, 0.1 ml for each. Each of them was exposed for 5 hours to a black light (1 mW·cm$^{-2}$). A blue color of methylene blue was slightly removed from the thin film dried at 120° C. and completely removed from the thin film after the heat treatment at 300° C., while the blue color was held in the glass alone.

UTILITY IN INDUSTRY

The layered titanic acid, lamellar titanic acid and lamellar titanium oxide of the present invention can be used for many purposes including fillers for paints and resins, cosmetic materials, pigments and catalysts, and can also be used in fields that require performances such as heat-resisting properties, reinforcing properties, sliding properties, ultraviolet radiation shielding properties, heat radiation reflecting properties, photocatalytic properties, gas barrier properties and ion exchange capabilities.

The invention claimed is:

1. A layered titanic acid obtained by subjecting a layered titanate represented by a general formula $A_xM_y\square_zTi_{2-(y+z)}O_4$, wherein A and M are different metals each with a valence of 1-3, $\square$ represents a defect site of Ti, x is a positive real number and satisfies 0<x<1.0, and y and z are independently 0 or a positive real number and satisfy 0<y+z<1.0, to an acid treatment to thereby substitute hydrogen ions or hydronium ions for 40-86% of A and M ions.

2. The layered titanic acid as recited in claim 1, obtained by substituting hydrogen ions or hydronium ions for 75-86% of said A and M ions.

3. The layered titanic acid as recited in claim 1, obtained by substituting hydrogen ions or hydronium ions for 40-75% of said A and M ions.

4. A lamellar titanic acid obtained by allowing a basic compound having an interlayer swelling effect to act on the layered titanic acid as recited in claim 1 to cause delamination thereof.

5. The lamellar titanic acid as recited in claim 4, wherein said basic compound is used in the amount of 5-200 equivalent % of the ion exchange capacity of the layered titanic acid to thereby delaminate the layered titanic acid to a mean thickness of 0.01-2 μm.

6. The lamellar titanic acid as recited in claim 5, wherein said basic compound is used in the amount of 5-40 equivalent % of the ion exchange capacity of the layered titanic acid.

7. The lamellar titanic acid as recited in claim 4, wherein said basic compound is removed by an acid treatment after it is allowed to act on the layered titanic acid for delamination thereof.

8. A lamellar titanium oxide obtained by subjecting the lamellar titanic acid as recited in claim 4 to a heat or hydrothermal treatment.

9. A suspension of lamellar titanic acid obtained by dispersing the lamellar titanic acid as recited in claim 4 in a liquid medium.

10. A film of titanic acid obtained by coating the suspension of lamellar titanic acid as recited in claim 9 onto a substrate and then drying the coating.

11. A film of titanium oxide obtained by heating the film of titanic acid as recited in claim 10.

12. A method for production of a lamellar titanic acid comprising the steps of providing the layered titanic acid as recited in claim 1, and allowing a basic compound having an interlayer swelling effect in the amount of 5-200 equivalent % of an ion exchange capacity of the layered titanic acid to act on the layered titanic acid to thereby delaminate the layered titanic acid to a mean thickness of 0.01-2 μm.

13. The method for production of a lamellar titanic acid as recited in claim 12, wherein the basic compound having an interlayer swelling effect in the amount of 5-40 equivalent % of an ion exchange capacity of the layered titanic acid is allowed to act on the layered titanic acid.

14. A lamellar titanium oxide obtained by subjecting the lamellar titanic acid as recited in claim 7 to a heat or hydrothermal treatment.

15. A suspension of lamellar titanic acid obtained by dispersing the lamellar titanic acid as recited in claim 7 in a liquid medium.

16. A film of titanic acid obtained by coating the suspension of lamellar titanic acid as recited in claim 7 onto a substrate and then drying the coating.

17. A film of titanium oxide obtained by heating the film of titanic acid as recited in claim 7.

* * * * *